UNITED STATES PATENT OFFICE.

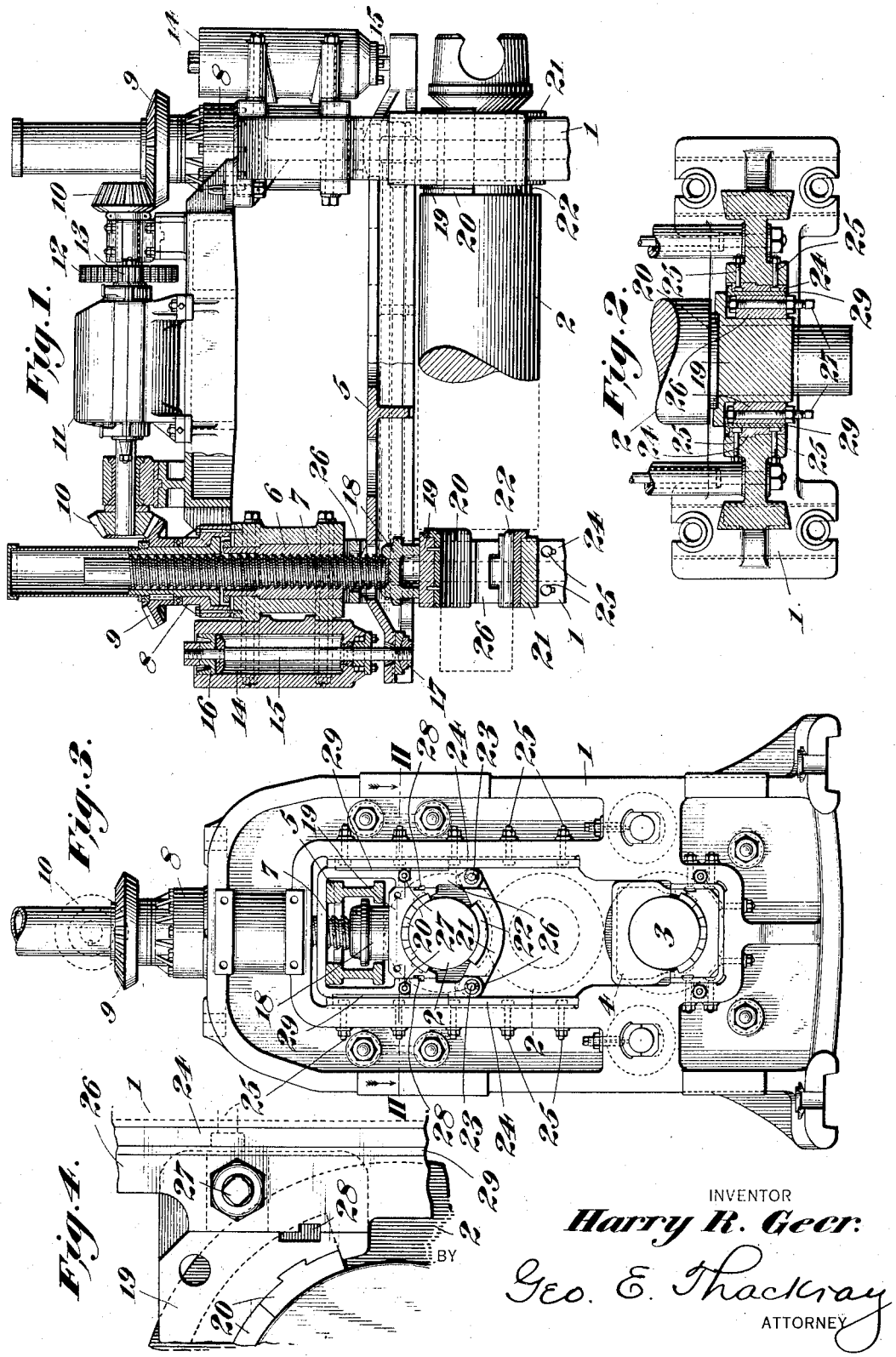

HARRY R. GEER, OF JOHNSTOWN, PENNSYLVANIA.

ROLL-CARRIAGE FOR ROLLING-MILLS.

1,369,334.   Specification of Letters Patent.   Patented Feb. 22, 1921.

Application filed April 13, 1920. Serial No. 373,578.

*To all whom it may concern:*

Be it known that I, HARRY R. GEER, a citizen of the United States, and a resident of the city of Johnstown, county of Cambria, and State of Pennsylvania, have invented certain new and useful Improvements in Roll-Carriages for Rolling-Mills; and I do hereby declare the following to be a full, clear, and exact description of the invention, such as will enable others skilled in the art to which it appertains to make and use the same.

My invention relates to improvements in rolling mills and provides a roll carriage of great rigidity and strength and of such construction as to facilitate changing the rolls. My invention is herein shown and described in connection with a two-high mill which has an adjustable roll provided with a screw adjusting means and fluid pressure operated pull-back cylinders.

My invention comprises a movable balance-beam extending longitudinally of the rolls and through windows in the housings, which are provided with opposed lateral bearing faces. Hangers supported by the balance-beam slidably engage the bearing faces of the windows in the housings. Rider bearings which are adjustably secured to the hangers, and carriers which are removably secured to the legs of the hangers and provided with bearings, form journals for the roll necks. Screws rotated by a motor or other source of power move the adjustable roll together with the balance-beam in one direction, but in the reverse direction the balance-beam and roll are moved by the action of the pull-back cylinders as the rotation of the adjusting screws is reversed. The pull-back cylinders further act at all times to hold the necks of the roll firmly against the rider bearings.

Having thus given a general description of my invention, I will now, in order to make the matter more clear, refer to the annexed sheet of drawings, which forms part of this specification and in which like characters refer to like parts.

Figure 1 is a front elevation of the top portion of a rolling mill illustrating an application of my invention, the left-hand side of the figure being shown in section;

Fig. 2 is a horizontal sectional view of one of the roll housings and a rider bearing and hanger, taken on the line II—II of Fig. 3;

Fig. 3 is an end elevation of the rolling mill with the pull-back cylinder removed and the end of the balance-beam shown in section; and Fig. 4 is a detail view of a portion of the roll housing and journal bearing drawn to a larger scale.

Referring now to the characters of reference on the drawings:—The roll housings are 1, the adjustable roll is 2 and the fixed roll is 3, the necks of which are journaled in the bearings 4. The balance-beam 5 which projects through the window in each housing has a hole near each end through which the adjusting screws 7 pass, and each of the adjusting screws 7 engages a nut 6 in the roll housings 1. Each of the casings 8 secured to the roll housings 1 serves as a bearing for the bevel gear 9 and as a journal for the gear sleeve. The bevel gear 9 meshes with the bevel pinion 10 on a shaft which is geared to the motor 11 by the spur gear 12 and the spur pinion 13 on the motor shaft.

The pull-back cylinders 14 have pistons 16 and the piston rods 15 which pass through holes in the ends of the balance-beam 5 and are secured thereto by the nuts 17. The pull-back cylinders 14 are adapted to raise the balance-beam 5 and the parts connected thereto, but are more particularly adapted to hold the necks of the adjustable roll 2 firmly against the rider bearings 19. The breakers 18 on which the lower end of the screws 7 bear, rest on the rider bearings 19 which have the bearings 20. The carriers 21 are provided with bearings 22 and are secured to the U-shaped hangers 26 by the pins 23. These hangers 26 are made of inverted U-shape and each of them is integral, and each leg of each hanger coöperates with one of the bearing plates in the windows of the housings, and the lower end of each leg is pivotally secured to a bearing 22 by the pin 23, thus allowing flexibility of motion, thereby obviating any cramping during the movement of said bearing by said U-shaped hanger, which cramping might be due to slight mis-alinement or wear. The lateral bearing plates 24 are attached to the sides of the roll housings 1 by the bolts 25. Longitudinal adjustment of the rider bearings 19 is provided for by the bolts 27 to maintain the register of the roll barrels. The recesses 28 in the sides of the hangers 26 and the rider bearings 19 serve as key-ways for keys which lock the bearings from turning and the additional width of key-way in the bearing allows for adjustment as the bearing wears. Liners 29 set in recesses in the sides of the hangers 26 provide bearing surfaces in contact with the lateral bearing plates 24.

I will now give a description of the operation of disassembling the roll carriage in order to show the facility with which the adjustable roll may be prepared for removal and how access is obtained to the parts that receive the most wear for inspection and renewal thereof.

The adjusting screw 7 when rotated in the desired direction by the motor 11 and connections therewith and against the pressure in the pull-back cylinders 14, will lower the adjustable roll 2 to the position shown by the dotted lines in Fig. 3. The adjustable roll 2 is then at rest on the fixed roll 3, and the pins 23 may be backed out of the hangers 26 and the carriers 21, thus releasing the hangers 26 from the roll 2. The balance-beam 5 carrying the breakers 18 may then be raised by supplying pressure in the pull-back cylinders 14 as the adjusting screws 7 are rotated in the opposite direction. As the balance-beam goes up it carries with it the hangers 26 and the rider bearings 19 or if desired the latter may be released by backing out the keys in the key-ways 28. The adjustable roll 2 may then be removed through the windows in the housings 1. The carriers 21 may be taken out and if necessary the bearings dressed or new ones put in place. By keeping the adjusting screws 7 raised and easing off the pressure in the pull-back cylinders 14, the balance-beam 5 may again be lowered and the hangers 26 removed for inspection and renewal, if necessary, of the lateral bearing plates 24 and the liners 29.

The advantages of my invention are thus readily apparent to those skilled in the art, since it provides a simple and efficient guide and support for an adjustable roll and also greatly facilitates changing the rolls, and the inspection and removal of the parts subject to wear.

Although I have shown and described my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a rolling mill, a roll housing, a window therein provided with opposed bearing surfaces, a U-shaped hanger slidably mounted in the window, means for supporting the hanger, a rider bearing adjustably mounted in the hanger, and a carrier removably secured to the legs of the hanger and forming, with the rider bearing, a journal for the neck of a roll.

2. In a rolling mill, an adjustable roll, housings therefor, means for adjusting and holding the roll, a balance-beam, U-shaped hangers slidably mounted in the housings and supported by the balance beam, the carriers secured to the legs of the hangers, and rider bearings mounted in the hangers and forming, with the carriers, journals for the roll necks.

3. In a rolling mill, an adjustable roll provided with adjusting and holding means, roll housings, windows therein provided with opposed bearing surfaces, a balance-beam extending longitudinally of the roll, hangers slidably mounted in the roll housing windows and supported by the balance-beam, rider bearings mounted in the hangers, means for adjusting the said bearings lengthwise of the roll, and carriers removably secured to the legs of the hangers and forming, with the rider bearings, journals for the roll necks.

4. In a rolling mill, an adjustable roll provided with adjusting and holding means, roll housings, windows therein provided with opposed bearing surfaces, a balance-beam above the adjustable roll extending longitudinally thereof and projecting through the roll housing windows, U-shaped hangers slidably mounted in the roll housing windows and supported by the balance-beam, rider bearings adjustably mounted between the legs of the U-shaped hangers, means for longitudinally adjusting the rider bearings, and carriers removably secured to the legs of the hangers and forming, with the rider bearings, journals for the roll necks.

5. In a roll carriage, a balance-beam extending between two housings and projecting through the windows thereof, means for holding the balance-beam, hangers slidably mounted in the housing windows and supported by the balance-beam, rider bearings adjustably mounted in the hangers, screw adjusting means adapted to bear on said rider bearings, and carriers secured to the legs of the hangers and forming, with the rider bearings, journals for the necks of a roll.

6. In a roll carriage, a balance-beam extending transversely of a pair of housings and having its ends projecting through windows in the housings, holding means attached to the projecting ends of the balance-beam, hangers slidably mounted in the housing windows and supported by the balance-beam, rider bearings mounted in the hangers, means for longitudinally adjusting the rider bearings, means for exerting downward pressure on the rider bearings, and carriers secured in the legs of the hangers and forming, with the rider bearings, journals for the necks of a roll.

In witness whereof I hereunto affix my signature.

HARRY R. GEER.